US009062234B2

(12) United States Patent
Du et al.

(10) Patent No.: US 9,062,234 B2
(45) **Date of Patent: *Jun. 23, 2015**

(54) ADHESIVE

(75) Inventors: Kunwen Du, Wuhan (CN); Kunwu Du, Wuhan (CN)

(73) Assignee: WUHAN KEDA MARBLE PROTECTIVE MATERIALS CO., LTD., Wuhan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/568,102

(22) Filed: Aug. 6, 2012

(65) Prior Publication Data

US 2012/0302686 A1 Nov. 29, 2012

Related U.S. Application Data

(63) Continuation-in-part of application No. PCT/CN2011/074041, filed on May 13, 2011.

(30) Foreign Application Priority Data

Jun. 8, 2010 (CN) .......................... 2010 1 0201018

(51) Int. Cl.

| | |
|---|---|
| ***C08K 3/22*** | (2006.01) |
| ***C09J 167/06*** | (2006.01) |
| ***C09J 167/07*** | (2006.01) |
| ***C08K 3/20*** | (2006.01) |
| *C08K 3/00* | (2006.01) |
| *C08K 5/00* | (2006.01) |
| *C08K 5/103* | (2006.01) |

(52) U.S. Cl.

CPC ................ *C09J 167/06* (2013.01); *C08K 3/20* (2013.01); *C08K 3/22* (2013.01); *C08K 3/0033* (2013.01); *C08K 5/0025* (2013.01); *C08K 5/103* (2013.01)

(58) Field of Classification Search

USPC .......................................................... 524/313
IPC .................. C09J 167/06,167/07; C09D 167/06, C09D 167/07; C08G 63/676
See application file for complete search history.

(56) References Cited

U.S. PATENT DOCUMENTS

| | | | | |
|---|---|---|---|---|
| 3,959,209 | A * | 5/1976 | Lake | 523/527 |
| 4,163,093 | A * | 7/1979 | Hess et al. | 528/301 |
| 4,877,656 | A * | 10/1989 | Baskin | 428/15 |
| 6,706,801 | B1 * | 3/2004 | Blum et al. | 524/507 |
| 2004/0234603 | A1 * | 11/2004 | Baum et al. | 424/486 |
| 2008/0207842 | A1 * | 8/2008 | Barthel et al. | 525/418 |
| 2009/0017215 | A1 * | 1/2009 | Wu et al. | 427/426 |

FOREIGN PATENT DOCUMENTS

| | | | |
|---|---|---|---|
| CN | 101531875 | A * | 9/2009 |
| JP | 2002322423 | A * | 11/2002 |
| JP | 2007077176 | A * | 3/2007 |
| WO | WO 2008141929 | A1 * | 11/2008 |

OTHER PUBLICATIONS

Machine Translation of CN 101531875 (Sep. 2009, 8 pages).*
Machine Translation of JP 2002-322423 (Nov. 2002, 13 pages).*
DuPont (DuPont Ti-Pure titanium dioxide: Titanium Dioxide for Coatings. DuPont. 2007, 28 pages).*
Nippon (Nippon Talc Product Information. Nippon Talc Co.,LTD. 2013. 5 pages.).*
NIIR (Synthetic Resins Technology Handbook. NIIR Board of Engineers & Consultants. 2005. 14 pages).*
Proof of Publishing date of NIIR (Synthetic Resins Technology Handbook. NIIR Board of Engineers & Consultants. 2005. 14 pages).*
Mondo (Talc in Polyester Putties. Technical Bulletin 1502. 2005. 10 pages).*
Nuplex (Resins for Industrial Metal (IM)-, Vehicle Refinish (VR)- And Commercial Transportation (CT)-Coatings. 2014. 3 pages).*
Degussa (Product Information: Aerosil 200. Jul. 2004. 2 pages).*
Lehmann & Voss & Co. (Luvotix R-RF. 2005. 3 pages).*
Machine translated English equivalent of JP 2007-077176 (Mar. 2007, 18 pages).*

* cited by examiner

*Primary Examiner* — Brieann R Fink
(74) *Attorney, Agent, or Firm* — Matthias Scholl P.C.; Matthias Scholl

(57) ABSTRACT

An adhesive including at least 100 weight parts of an unsaturated polyester resin suitable for air-drying, between 0 and 5 weight parts of hydrogenated castor oil, between 1 and 20 weight parts of a nano powder, between 10 and 250 weight parts of a filler, and between 1 and 15 weight parts of an anti-shrinking agent.

16 Claims, No Drawings

ADHESIVE

CROSS-REFERENCE TO RELATED APPLICATIONS

This application is a continuation-in-part of International Patent Application No. PCT/CN2011/074041 with an international filing date of May 13, 2011, designating the United States, now pending, and further claims priority benefits to Chinese Patent Application No. 201010201018.X filed Jun. 8, 2010. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Dr., Suite 1319, Houston, Tex. 77079.

BACKGROUND OF THE INVENTION

1. Field of the Invention

The invention relates to an adhesive for filling in gaps between stones. The adhesive is also suitable for filling in gaps between ceramics.

2. Description of the Related Art

Unsaturated resin adhesives are mainly used for filling in and bonding stone. In China, they are mainly used for marble, thereby with a nickname of marble glue. This kind of bonding using filling in can only bear a minor load, belonging to non-structural bonding. Structural bonding means supporting a big load. Different from structural bonding, non-structural bonding employs organic adhesives to mend, fill in, strengthen, and fix the defects of stone, for example, fissures, cracks, apertures, and sand holes.

Bonding using filling in (non-structural bonding) has huge difference from structural bonding in load-carrying capability. Bonding using filling in basically does not bear load, and the function of the filling in is mainly to beautify stone and standardize product size. In the past few years, with the rapid development of bonding adhesives, marble glue has been widely applied in household decoration, quick positioning, amendment, splicing, and filling in gaps of stone.

Marble glue is mainly used for the bonding of stone with the ground, or the bonding of stone with wall having a height of less than 9 meters. Marble glue is required to bear a minor load, and thus the bonding strength thereof should meet a certain standard, but the requirement for air dry, brightness, contractility, and permeability is low. Gap-filling adhesives are mainly used for filling in gaps between stone and need contact with air. Thus, there is a low requirement on the bonding strength of gap-filling adhesives in contrast to that of marble glue, but the air drying, brightness, contractility, and permeability thereof should be high.

Marble glue, if used as a gap-filling adhesive, has the following disadvantages: a) poor air drying property, and viscidity after curing; b) there is a color difference between polished glue and stone; 3) poor contractility resistance, which makes the cured glue concave or separate from stone; and 4) poor permeability, which results in an incomplete filling in or produces holes.

SUMMARY OF THE INVENTION

For filling in gaps between stones, an adhesive should have the following characteristics:

1) The adhesive should have good permeability, that is to say, the colloid of the adhesive is fine and easy to blend, and after curing agents added, the adhesive has a certain fluidity and can permeate into small cracks in the stone. Because the colloid is fine, so is the filling joint, which increases the sense of beauty. 2) The adhesive should have good air-drying property and be not sticky after curing, which means an instant polishing can be carried out and no black spots occurs in the filling joints. 3) The adhesive should have good shrinkage resistance so that after the adhesive cured, no concave formed and the adhesive will not separate from stone. 4) The polished adhesive should have a brightness (dependent on the hardness of the adhesive) equivalent as that of polished stone the adhesive.

In view of the above-described problems, it is one objective of the invention to provide a gap-filling adhesive for colored stones.

To achieve the above objectives, in accordance with one embodiment of the invention, there is provided an adhesive comprising at least 100 weight parts of an unsaturated polyester resin suitable for air-drying, between 0 and 5 weight parts of hydrogenated castor oil, between 1 and 20 weight parts of a nano powder, between 10 and 250 weight parts of a filler, and between 1 and 15 weight parts of an anti-shrinking agent.

In a class of this embodiment, the adhesive comprises at least 100 weight parts of the unsaturated polyester resin suitable for air-drying, between 1 and 3 weight parts of the hydrogenated castor oil, between 3 and 10 weight parts of the nano powder, between 50 and 200 weight parts of the filler, and between 5 and 10 weight parts of the anti-shrinking agent.

In a class of this embodiment, the adhesive comprises 100 weight parts of the unsaturated polyester resin suitable for air-drying, one weight part of the hydrogenated castor oil, 6 weight parts of the nano powder, 70 weight parts of the filler, and 8 weight parts of the anti-shrinking agent.

In a class of this embodiment, the unsaturated polyester resin suitable for air-drying is selected from the group consisting of dicyclopentadiene-modified unsaturated polyester resin synthesized using half-esterification, allyl glycidyl ether-modified unsaturated polyester resin, or trimethylolpropane diallyl ether-modified unsaturated polyester resin.

In a class of this embodiment, the adhesive further comprises between 1 and 5 weight parts of an active diluent which makes the adhesive easy to blend and permeate but doesn't affect the bonding strength thereof.

In a class of this embodiment, the nano powder and the filler is dispersed using ultrasonic wave and stirred at a high speed of at least 1,500 rpm.

In a class of this embodiment, the nano powder is selected from the group consisting of nano silicon dioxide, nano calcium carbonate, nano magnesium silicate, nano calcium oxide, nano alumina, or a mixture thereof.

In a class of this embodiment, the filler is selected from the group consisting of calcium carbonate, talcum powder, heavy calcium carbonate, quartz powder, calcium stearate, dolomite powder, bentonite, barium sulfate, or a mixture thereof.

In a class of this embodiment, the anti-shrinking agent is selected from the group consisting of polypropyl acetate, poly (adipate-co-propanetriol), poly vinyl acetate, polyacrylate, polystyrene, polyethylene, polyvinyl chloride, polymethyl methacrylate, or a mixture thereof.

In a class of this embodiment, the active diluent is selected from the group consisting of styrene, α-methyl styrene, glycerol diallyl ether adipate, diallyl phthalate, 2-chlorostyrene, p-tert-butyl styrene, or a mixture thereof.

In a class of this embodiment, the adhesive further comprises between 5 and 20 weight parts of rutile titanium dioxide.

In a class of this embodiment, the adhesive further comprises a colored pigment.

In a class of this embodiment, the filler used is between 300 and 1,250 mesh on the average.

Advantages of the invention are summarized below. 1) The adhesive has good permeability, fine colloid, and is easy to blend. After curing agents added, it has a certain fluidity and can be permeate into small cracks in the stone. Because the colloid is fine, so is the filling joint, which increases the sense of beauty. 2) The adhesive has good air-drying quality, and thus is not sticky after curing, which means an instant polishing can be carried out. 3) The adhesive has strong shrinkage resistance, neither concave nor separation from the stone happening after curing. 4) The polished adhesive has a brightness equivalent as that of polished stone. 5) The adhesive has a higher bonding strength, because it rarely uses hydrogenated castor oil as a thixotropic agent which decreases the bonding strength. 6) The adhesive has good ageing resistance and stable colors, and particularly, the white adhesive is not easy to turn yellow (the rutile titanium dioxide makes the color stable). 7) The invention solves the difficult problem of gap-filling of stone and as a new category of marble glue, and the adhesive enriches the type of marble glue.

DETAILED DESCRIPTION OF THE EMBODIMENTS

For further illustrating the invention, experiments detailing an adhesive for colored stones are described below. It should be noted that the following examples are intended to describe and not to limit the invention.

When cured in the air, an unsaturated polyester resin suitable for air-drying is dried to form film, free of interference from oxygen, and the surface thereof is not sticky. The characteristic is known as air dry.

The principle of air dry is described below.

When an unsaturated polyester resin (UPR in short) is cured at normal temperature, the surface thereof is often sticky, which causes inconvenience for use. The curing mechanism of UPR is based on the radical copolymerization. The activity of free radicals determines the polymerization rate thereby affecting the size of the polymer molecular weight.

If oxygen is involved in the curing of unsaturated polyester resins, a sticky surface will form. Free radical R. generated at early stage contacts with oxygen to yield a polymer peroxy radical $RO_2$.. The activity of R. is stronger than that of $RO_2$.. The half life of R. is $10^{-8}$ s, and that of $RO_2$. is $10^{-2}$ s. On the surface, the $RO_2$. is dominant, thereby inhibiting the increase of polymer molecular weight. However, the polymer peroxy radical $RO_2$. easily contacts with hydrogen connected to positively-charged carbon to yield a polymer hydroperoxide, that is, $$ROO.+HR_1 \rightarrow ROOH+R_1..$$

The polymer hydroperoxide can produce free radicals with strong activity to make reaction proceed to yield high molecular weight polymers.

For example, allyl ether ($CH_2$=CH—$CH_2$—O—) and non-conjugated double bonds (—CH=CH—$CH_2$—CH=CH—) have positive carbon atoms, and thus have the capacity of automatic oxygen absorption.

The anti-shrinkage mechanism of an anti-shrinking agent of the invention is described below. When a gap-filing adhesive of the invention is curing, the anti-shrinking agent experiences thermal expansion. The expansion offsets the volume contraction originated from the curing of the polyester around the corner. Subsequently, the two phases are cooled simultaneously. Because the anti-shrinking agent has bigger shrinking percentage than the polyester, many small holes form at the interface of the two phases. The formation of the holes eliminates the internal stress, and thus the polyester no longer contracts.

The unsaturated polyester resin suitable for air-drying includes but is not limited to dicyclopentadiene-modified unsaturated polyester resin synthesized using half-esterification, allyl glycidyl ether-modified unsaturated polyester resin, or trimethylolpropane diallyl ether-modified unsaturated polyester resin. All these polyester resins can be purchased from markets. The shrinking percentage of the unsaturated polyester resin suitable for air-drying is about between 5 and 8%.

The active diluent selected from the group consisting of diallyl phthalate, 2-chlorostyrene, and p-tert-butyl styrene, has capacity of anti-shrinking. As an active diluent, glycerol diallyl ether adipate has capacity of air dry. All these active diluents can be purchased from markets. As needed, other active diluents can also be applied.

The anti-shrinking agent is selected from the group consisting of polypropyl acetate, poly (adipate-co-propanetriol), poly vinyl acetate, polyacrylate, polystyrene, polyethylene, polyvinyl chloride, polymethyl methacrylate, or a mixture thereof.

The properties of conventional marble glue are given below:

| Properties | | Conventional marble glue | | |
|---|---|---|---|---|
| Color | | White | Cream-colored | Trans-parent |
| Mechanical properties | Pressure-shear (MPa) | 7.6 | 10.8 | 10.9 |
| | Tensile-shear (MPa) | 13.1 | 13.3 | 11.9 |
| | Rebound deflection (MPa) | 5059.8 | 5491.9 | 2386.2 |
| | Impact flexibility ($KJ/m^2$) | 1.68 | 2.00 | 2.48 |
| Hardness (HSD) | | 41.2 | 43.4 | 54.9 |

Technical indexes according to building materials industry standards JC/T989-2006, PRC. are given below:

| Items | | | Technical indexes | |
|---|---|---|---|---|
| | | | High-class products | Qualified products |
| Color, appearance, and state in a container | | | Products should be fine viscous paste with uniform color, without obvious isolation and gel as well as rough particles, easy to stir, and color or package of products should be clearly distinguishable. | |
| Rebound deflection (MPa) ≥ | | | 2000 | 1500 |
| Impact flexibility ($KJ/m^2$) ≥ | | | 3.0 | 2.0 |
| Pressure-shear strength (MPa) ≥ | Stone-stone | Standard conditions | 8.0 | 7.0 |

EXAMPLE 1

An adhesive for colored stones comprises 100 weight parts of an unsaturated polyester resin suitable for air-drying, 8 weight parts of nano silicon dioxide, 3 weight parts of nano calcium carbonate, 3 weight parts of nano magnesium silicate, 3 weight parts of nano calcium oxide, 3 weight parts of nano alumina, 10 weight parts of calcium carbonate (1,000 mesh on the average), and one weight part of an anti-shrinking agent. The adhesive is cream-colored.

The unsaturated polyester resin suitable for air-drying is dicyclopentadiene-modified unsaturated polyester resin synthesized using half-esterification. The anti-shrinking agent is one weight part of polyacrylate.

Measurement shows that, the pressure-shear strength of the adhesive is 16.9 MPa, the tensile-shear strength thereof is 17.2 MPa, the rebound deflection thereof is 4258.2 MPa, the impact flexibility thereof is 4.51 $KJ/m^2$, the hardness thereof is 64.1 HSD, and the shrinking percentage thereof is 2.42%.

In use, the adhesive is mixed and stirred uniformly with a curing agent, a mixing ratio of the adhesive to the curing agent being 100:3 which can be adjusted as necessary.

EXAMPLE 2

An adhesive for colored stones comprises 100 weight parts of an unsaturated polyester resin suitable for air-drying, 5 weight parts of hydrogenated castor oil, one weight part of nano calcium carbonate, 10 weight parts of calcium carbonate (300 mesh on the average), 10 weight parts of heavy calcium carbonate, 2 weight parts of talcum powder (1250 mesh on the average), 15 weight parts of an anti-shrinking agent, and 5 weight parts of an active diluent. The adhesive is cream-colored.

The unsaturated polyester resin suitable for air-drying is allyl glycidyl ether-modified unsaturated polyester resin. The anti-shrinking agent is 7 weight parts of poly vinyl acetate and 8 weight parts of polypropyl acetate. The active diluent is 2 weight parts of glycerol diallyl ether adipate and 3 weight parts of diallyl phthalate.

Measurement shows that, the pressure-shear strength of the adhesive is 16.1 MPa, the tensile-shear strength thereof is 15.8 MPa, the rebound deflection thereof is 4536.6 MPa, the impact flexibility thereof is 4.23 $KJ/m^2$, the hardness thereof is 62.0 HSD, and the shrinking percentage thereof is 0.11%.

The usage method of the adhesive is the same as that in Example 1.

EXAMPLE 3

An adhesive for colored stones comprises 100 weight parts of an unsaturated polyester resin suitable for air-drying, 3 weight parts of hydrogenated castor oil, 3 weight parts of nano magnesium silicate, 100 weight parts of heavy calcium carbonate (300 mesh on the average), 30 weight parts of barium sulfate, 20 weight parts of quartz powder, 10 weight parts of an anti-shrinking agent, and 3 weight parts of an active diluent. The adhesive is cream-colored.

The unsaturated polyester resin suitable for air-drying is allyl glycidyl ether-modified unsaturated polyester resin. The anti-shrinking agent is 5 weight parts of polyacrylate and 5 weight parts of poly (adipate-co-propanetriol). The active diluent is 3 weight parts of diallyl phthalate.

Measurement shows that, the pressure-shear strength of the adhesive is 15.2 MPa, the tensile-shear strength thereof is 15.9 MPa, the rebound deflection thereof is 6883.2 MPa, the impact flexibility thereof is 2.89 $KJ/m^2$, the hardness thereof is 54.6 HSD, and the shrinking percentage thereof is 0.66%.

The usage method of the adhesive is the same as that in Example 1.

EXAMPLE 4

An adhesive for colored stones comprises 100 weight parts of an unsaturated polyester resin suitable for air-drying, one weight part of hydrogenated castor oil, 5 weight parts of nano silicon dioxide, 3 weight parts of nano calcium carbonate, 2 weight parts of nano magnesium silicate, 130 weight parts of barium sulfate (700 mesh on the average), 50 weight parts of calcium carbonate, 15 weight parts of heavy calcium carbonate, 5 weight parts of talcum powder, 5 weight parts of an anti-shrinking agent, and one weight part of an active diluent. The adhesive is cream-colored.

The unsaturated polyester resin suitable for air-drying is dicyclopentadiene-modified unsaturated polyester resin synthesized using half-esterification. The anti-shrinking agent is 3 weight parts of polyethylene and 2 weight parts of polyacrylate. The active diluent is one weight parts of 2-chlorostyrene.

Measurement shows that, the pressure-shear strength of the adhesive is 14.3 MPa, the tensile-shear strength thereof is 15.1 MPa, the rebound deflection thereof is 5980.0 MPa, the impact flexibility thereof is 3.02 $KJ/m^2$, the hardness thereof is 51.8 HSD, and the shrinking percentage thereof is 1.27%.

The usage method of the adhesive is the same as that in Example 1.

EXAMPLE 5

An adhesive for colored stones comprises 100 weight parts of an unsaturated polyester resin suitable for air-drying, 3 weight parts of nano silicon dioxide, 2 weight parts of nano calcium oxide, 100 weight parts of calcium carbonate (400 mesh on the average), 100 weight parts of barium sulfate, 20 weight parts of bentonite, 20 weight parts of quartz powder, 8 weight parts of dolomite powder, 2 weight parts of talcum powder, 10 weight parts of an anti-shrinking agent, and 2 weight parts of active diluent. The adhesive is cream-colored.

The unsaturated polyester resin suitable for air-drying is trimethylolpropane diallyl ether-modified unsaturated polyester resin. The anti-shrinking agent is 5 weight parts of polystyrene and 5 weight parts of polymethyl methacrylate. The active diluent is 2 weight parts of p-tert-butyl styrene.

Measurement shows that, the pressure-shear strength of the adhesive is 13.8 MPa, the tensile-shear strength thereof is 14.6 MPa, the rebound deflection thereof is 6891.2 MPa, the impact flexibility thereof is 2.45 $KJ/m^2$, the hardness thereof is 50.5 HSD, and the shrinking percentage thereof is 0.82%.

The usage method of the adhesive is the same as that in Example 1.

EXAMPLE 6

An adhesive for colored stones comprises 100 weight parts of an unsaturated polyester resin suitable for air-drying, 3 weight parts of nano silicon dioxide, 2 weight parts of nano magnesium silicate, 2 weight parts of nano calcium oxide, one weight part of nano alumina, 40 weight parts of calcium carbonate (400 mesh on the average), 8 weight parts of bentonite, 2 weight parts of calcium stearate, 12 weight parts of an anti-shrinking agent, and 4 weight parts of an active diluent. The adhesive is cream-colored.

The unsaturated polyester resin suitable for air-drying is dicyclopentadiene-modified unsaturated polyester resin synthesized using half-esterification. The anti-shrinking agent is 3 weight parts of poly vinyl acetate, 2 weight parts of polyacrylate, 5 weight parts of polystyrene, and 2 weight parts of polyethylene. The active diluent is 2 weight parts of glycerol diallyl ether adipate and 2 weight parts of 2-chlorostyrene.

Measurement shows that, the pressure-shear strength of the adhesive is 17.6 MPa, the tensile-shear strength thereof is 18.3 MPa, the rebound deflection thereof is 4973.2 MPa, the impact flexibility thereof is 3.65 KJ/$m^2$, the hardness thereof is 62.3 HSD, and the shrinking percentage thereof is 0.12%.

The usage method of the adhesive is the same as that in Example 1.

EXAMPLE 7

An adhesive for colored stones comprises 100 weight parts of an unsaturated polyester resin suitable for air-drying, 4 weight parts of nano silicon dioxide, 75 weight parts of calcium carbonate (800 mesh on the average), 5 weight parts of talcum powder (1250 mesh on the average), 10 weight parts of an anti-shrinking agent, and 2 weight parts of an active diluent. The adhesive is cream-colored.

The unsaturated polyester resin suitable for air-drying is trimethylolpropane diallyl ether-modified unsaturated polyester resin. The anti-shrinking agent is 3 weight parts of polystyrene and 7 weight parts of polymethyl methacrylate. The active diluent is 2 weight parts of diallyl phthalate.

Measurement shows that, the pressure-shear strength of the adhesive is 18.1 MPa, the tensile-shear strength thereof is 18.5 MPa, the rebound deflection thereof is 5210.4 MPa, the impact flexibility thereof is 3.47 KJ/$m^2$, the hardness thereof is 61.5 HSD, and the shrinking percentage thereof is 0.83%.

The usage method of the adhesive is the same as that in Example 1.

EXAMPLE 8

An adhesive for colored stones comprises 100 weight parts of an unsaturated polyester resin suitable for air-drying, 5 weight parts of nano calcium carbonate, 140 weight parts of calcium carbonate (400 mesh on the average), 3 weight parts of talcum powder, 10 weight parts of an anti-shrinking agent, 5 weight parts of titanium dioxide, and 3 weight parts of an active diluent. The adhesive is white.

The unsaturated polyester resin suitable for air-drying is t dicyclopentadiene-modified unsaturated polyester resin synthesized using half-esterification. The anti-shrinking agent is poly vinyl acetate. The active diluent is p-tert-butyl styrene. The titanium dioxide is rutile.

Measurement shows that, the pressure-shear strength of the adhesive is 15.8 MPa, the tensile-shear strength thereof is 16.5 MPa, the rebound deflection thereof is 5764.2 MPa, the impact flexibility thereof is 3.34 KJ/$m^2$, the hardness thereof is 53.4 HSD, and the shrinking percentage thereof is 0.06%.

The usage method of the adhesive is the same as that in Example 1.

EXAMPLE 9

An adhesive for colored stones comprises 100 weight parts of an unsaturated polyester resin suitable for air-drying, 4 weight parts of nano silicon dioxide, one weight part of nano calcium oxide, one weight part of nano alumina, 70 weight parts of calcium carbonate (900 mesh on the average), 3 weight parts of talcum powder, 8 weight parts of an anti-shrinking agent, 10 weight parts of titanium dioxide, and 2 weight parts of an active diluent. The adhesive is white.

The unsaturated polyester resin suitable for air-drying is trimethylolpropane diallyl ether-modified unsaturated polyester resin. The anti-shrinking agent is polyacrylate. The active diluent is 2-chlorostyrene. The titanium dioxide is rutile.

Measurement shows that, the pressure-shear strength of the adhesive is 18.3 MPa, the tensile-shear strength thereof is 18.4 MPa, the rebound deflection thereof is 5018.6 MPa, the impact flexibility thereof is 3.58 KJ/$m^2$, the hardness thereof is 62.7 HSD, and the shrinking percentage thereof is 0.15%.

The usage method of the adhesive is the same as that in Example 1.

EXAMPLE 10

An adhesive for colored stones comprises 100 weight parts of an unsaturated polyester resin suitable for air-drying, 4 weight parts of nano silicon dioxide, 2 weight parts of nano calcium carbonate, 2 weight parts of nano alumina, 100 weight parts of calcium carbonate (500 mesh on the average), 10 weight parts of bentonite, 5 weight parts of talcum powder, 9 weight parts of an anti-shrinking agent, 15 weight parts of titanium dioxide, and 5 weight parts of an active diluent. The adhesive is white.

The unsaturated polyester resin suitable for air-drying is trimethylolpropane diallyl ether-modified unsaturated polyester resin. The anti-shrinking agent is polymethyl methacrylate. The active diluent is one weight part of styrene, one weight part of $\alpha$-methyl styrene, one weight part of glycerol diallyl ether adipate, one weight part of diallyl phthalate, and one weight part of 2-chlorostyrene. The titanium dioxide is rutile.

Measurement shows that, the pressure-shear strength of the adhesive is 17.3 MPa, the tensile-shear strength thereof is 16.8 MPa, the rebound deflection thereof is 5430.8 MPa, the impact flexibility thereof is 3.31 KJ/$m^2$, the hardness thereof is 57.1 HSD, and the shrinking percentage thereof is 0.53%.

The usage method of the adhesive is the same as that in Example 1.

EXAMPLE 11

An adhesive for colored stones comprises 100 weight parts of an unsaturated polyester resin suitable for air-drying, 5 weight parts of nano calcium carbonate, 150 weight parts of calcium carbonate (400 mesh on the average), 2 weight parts of talcum powder, 10 weight parts of an anti-shrinking agent, 20 weight parts of titanium dioxide, and 5 weight parts of an active diluent. The adhesive is white.

The unsaturated polyester resin suitable for air-drying is allyl glycidyl ether-modified unsaturated polyester resin. The anti-shrinking agent is 2 weight parts of poly vinyl acetate, 2 weight parts of polyacrylate, 2 weight parts of polystyrene, 2 weight parts of polyethylene, and 2 weight parts of polyvinyl chloride. The active diluent is 2 weight parts of glycerol diallyl ether adipate, one weight part of diallyl phthalate, one weight part of 2-chlorostyrene, and one weight part of p-tert-butyl styrene.

Measurement shows that, the pressure-shear strength of the adhesive is 15.7 MPa, the tensile-shear strength thereof is 16.3 MPa, the rebound deflection thereof is 5813.4 MPa, the impact flexibility thereof is 3.28 KJ/$m^2$, the hardness thereof is 52.9 HSD, and the shrinking percentage thereof is 0.33%.

The usage method of the adhesive is the same as that in Example 1.

EXAMPLE 12

An adhesive for colored stones comprises 100 weight parts of an unsaturated polyester resin suitable for air-drying, 5 weight parts of nano calcium carbonate, 150 weight parts of heavy calcium carbonate (500 mesh on the average), 3 weight parts of talcum powder, 10 weight parts of an anti-shrinking agent, 4 weight parts of an active diluent, and a red pigment (the pigment is added according to the requirement of the colloid, and the usage amount thereof is dependent on the depth of the pigment). The adhesive is red.

The unsaturated polyester resin suitable for air-drying is dicyclopentadiene-modified unsaturated polyester resin synthesized using half-esterification. The anti-shrinking agent is polyacrylate. The active diluent is 2 weight parts of glycerol diallyl ether adipate and 2 weight parts of diallyl phthalate.

Measurement shows that, the pressure-shear strength of the adhesive is 16.0 MPa, the tensile-shear strength thereof is 16.2 MPa, the rebound deflection thereof is 5875.1 MPa, the impact flexibility thereof is 3.19 KJ/$m^2$, the hardness thereof is 53.8 HSD, and the shrinking percentage thereof is 0.05%.

The usage method of the adhesive is the same as that in Example 1.

EXAMPLE 13

An adhesive for colored stones comprises 100 weight parts of an unsaturated polyester resin suitable for air-drying, 3 weight parts of nano calcium carbonate, 3 weight parts of nano magnesium silicate, 150 weight parts of heavy calcium carbonate (400 mesh on the average), 2 weight parts of talcum powder, 10 weight parts of an anti-shrinking agent, 3 weight parts of an active diluent, and a yellow pigment (the pigment is added according to the requirement of the colloid, and the usage amount thereof is dependent on the depth of the pigment). The adhesive is yellow.

The unsaturated polyester resin suitable for air-drying is allyl glycidyl ether-modified unsaturated polyester resin. The anti-shrinking agent is 6 weight parts of poly vinyl acetate and 4 weight parts of polymethyl methacrylate. The active diluent is 2 weight parts of diallyl phthalate and one weight part of 2-chlorostyrene.

Measurement shows that, the pressure-shear strength of the adhesive is 16.3 MPa, the tensile-shear strength thereof is 16.8 MPa, the rebound deflection thereof is 6012.4 MPa, the impact flexibility thereof is 3.05 KJ/$m^2$, the hardness thereof is 54.0 HSD, and the shrinking percentage thereof is 0.17%.

The usage method of the adhesive is the same as that in Example 1.

EXAMPLE 14

An adhesive for colored stones comprises 100 weight parts of an unsaturated polyester resin suitable for air-drying, 3 weight parts of nano magnesium silicate, 3 weight parts of nano calcium oxide, 3 weight parts of nano alumina, 15 weight parts of calcium carbonate (800 mesh on the average), 10 weight parts of an anti-shrinking agent, 3 weight parts of an active diluent, and a yellow pigment (the pigment is added according to the requirement of the colloid, and the usage amount thereof is dependent on the depth of the pigment). The adhesive is yellow.

The unsaturated polyester resin suitable for air-drying is allyl glycidyl ether-modified unsaturated polyester resin. The anti-shrinking agent is 6 weight parts of poly vinyl acetate and 4 weight parts of polymethyl methacrylate. The active diluent is 2 weight parts of diallyl phthalate and one weight part of 2-chlorostyrene.

Measurement shows that, the pressure-shear strength of the adhesive is 16.8 MPa, the tensile-shear strength thereof is 17.4 MPa, the rebound deflection thereof is 4364.7 MPa, the impact flexibility thereof is 4.33 KJ/$m^2$, the hardness thereof is 63.8 HSD, and the shrinking percentage thereof is 0.23%.

The usage method of the adhesive is the same as that in Example 1.

EXAMPLE 15

An adhesive for colored stones comprises 100 weight parts of an unsaturated polyester resin suitable for air-drying, 4 weight parts of nano alumina, 100 weight parts of calcium carbonate (300 mesh on the average), 110 weight parts of barium sulfate, 10 weight parts of an anti-shrinking agent, 3 weight parts of an active diluent, and a yellow pigment (the pigment is added according to the requirement of the colloid, and the usage amount thereof is dependent on the depth of the pigment). The adhesive is yellow.

The unsaturated polyester resin suitable for air-drying is allyl glycidyl ether-modified unsaturated polyester resin. The anti-shrinking agent is 6 weight parts of poly vinyl acetate and 4 weight parts of polymethyl methacrylate. The active diluent is 2 weight parts of diallyl phthalate and one weight part of 2-chlorostyrene.

Measurement shows that, the pressure-shear strength of the adhesive is 14.2 MPa, the tensile-shear strength thereof is 14.8 MPa, the rebound deflection thereof is 6130.7 MPa, the impact flexibility thereof is 2.95 KJ/$m^2$, the hardness thereof is 50.9 HSD, and the shrinking percentage thereof is 0.28%.

The usage method of the adhesive is the same as that in Example 1.

After experimental use, the adhesive fully satisfies the requirement for filling in gaps between stones.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An adhesive comprising:

at least 100 weight parts of an unsaturated polyester resin suitable for air-drying selected from the group consisting of allyl glycidyl ether-modified unsaturated polyester resin, and trimethylolpropane diallyl ether-modified unsaturated polyester resin, between 0 and 5 weight parts of hydrogenated castor oil, between 1 and 20 weight parts of a nano powder selected from the group consisting of nano calcium carbonate, nano magnesium silicate, nano calcium oxide, nano alumina, and a mixture thereof, between 10 and 250 weight parts of a filler, between 1 and 15 weight parts of an anti-shrinking agent, and between 1 and 5 weight parts of an active diluent selected from the group consisting of α-methyl styrene, diallyl phthalate, 2-chlorostyrene, p-tert-butyl styrene, and a mixture thereof.

2. The adhesive of claim 1, comprising at least 100 weight parts of the unsaturated polyester resin suitable for air-drying, between 1 and 3 weight parts of the hydrogenated castor oil, between 3 and 10 weight parts of the nano powder, between 50 and 200 weight parts of the filler, and between 5 and 10 weight parts of the anti-shrinking agent.

3. The adhesive of claim 2, comprising 100 weight parts of the unsaturated polyester resin suitable for air-drying, one weight part of the hydrogenated castor oil, 6 weight parts of the nano powder, 70 weight parts of the filler, and 8 weight parts of the anti-shrinking agent.

4. The adhesive of claim 1, wherein the nano powder and the filler are dispersed using ultrasonic wave and stirred at least 1,500 rpm.

5. The adhesive of claim 1, wherein the filler is selected from the group consisting of calcium carbonate, talcum powder, heavy calcium carbonate, quartz powder, calcium stearate, dolomite powder, calcium stearate, barium sulfate, or a mixture thereof.

6. The adhesive of claim 1, wherein the anti-shrinking agent is selected from the group consisting of polypropyl acetate, poly (adipate-co-propanetriol), poly vinyl acetate, polyacrylate, polystyrene, polyethylene, polyvinyl chloride, polymethyl methacrylate, or a mixture thereof.

7. The adhesive of claim 1, further comprising between 5 and 20 weight parts of rutile titanium dioxide.

8. The adhesive of claim 1, further comprising a colored pigment.

9. The adhesive of claim 5, wherein the filler used is between 300 and 1,250 mesh on the average.

10. The adhesive of claim 1, wherein the unsaturated polyester resin is trimethylolpropane diallyl ether-modified unsaturated polyester resin.

11. The adhesive of claim 1, wherein the nano powder is nano calcium carbonate, nano magnesium silicate, nano calcium oxide, nano alumina, or a mixture thereof.

12. An adhesive comprising:

at least 100 weight parts of an unsaturated polyester resin selected from the group consisting of allyl glycidyl ether-modified unsaturated polyester resin, and trimethylolpropane diallyl ether-modified unsaturated polyester resin;

between 0 and 5 weight parts of hydrogenated castor oil;

between 1 and 20 weight parts of a nano powder selected from the group consisting of nano magnesium silicate, nano calcium oxide, and a mixture thereof;

between 10 and 250 weight parts of a filler;

between 1 and 15 weight parts of an anti-shrinking agent selected from the group consisting of poly (adipate-co-propanetriol), poly vinyl acetate, polyvinyl chloride, and a mixture thereof; and between 1 and 5 weight parts of an active diluent selected from the group consisting of $\alpha$-methyl styrene, diallyl phthalate, 2-chlorostyrene, p-tert-butyl styrene, and a mixture thereof.

13. The adhesive of claim 12, wherein the unsaturated polyester resin is trimethylolpropane diallyl ether-modified unsaturated polyester resin.

14. The adhesive of claim 12, wherein the nano powder and the filler are dispersed using ultrasonic wave, and are stirred in the adhesive at a speed of at least 1,500 rpm.

15. The adhesive of claim 12, wherein the filler is selected from the group consisting of calcium carbonate, talcum powder, heavy calcium carbonate, quartz powder, calcium stearate, dolomite powder, calcium stearate, barium sulfate, and a mixture thereof.

16. The adhesive of claim 12, wherein the unsaturated polyester resin is allyl glycidyl ether-modified unsaturated polyester resin, the nano powder is nano magnesium silicate, the anti-shrinking agent is poly (adipate-co-propanetriol), and the active diluent is diallyl phthalate.

* * * * *